Patented Oct. 31, 1944

2,361,613

UNITED STATES PATENT OFFICE 2,361,613

ISOMERIZATION OF HYDROCARBONS

Harry E. Drennan, Bartlesville, Okla., assignor to Phillips Petroleum Company, a corporation of Delaware No Drawing. Application June 12, 1942, Serial No. 446,771

4 Claims. (Cl. 260—683.2)

This invention relates to a process for the catalytic isomerization of olefinic hydrocarbons, and more specifically to a novel catalyst and process for the isomerization of normal olefins in hydrocarbon mixtures at moderately elevated temperatures. This invention is particularly useful in the conversion of butene-1 to butene-2, and provides a new and particularly effective catalyst for this conversion.

Alpha olefins, generally referred to as 1-olefins, undergo an isomerization reaction whereby the double linkage migrates toward the center of the carbon chain and beta or 2-olefins are formed. In the case of normal butenes, this reaction may be represented by the equation,

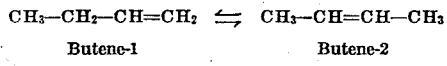

$$CH_3-CH_2-CH=CH_2 \rightleftharpoons CH_3-CH=CH-CH_3$$

Butene-1    Butene-2

The isomers thus represented are identical in many of their chemical properties but differ rather widely in some physical characteristics. Some of the 1-olefins, for example, the normal butenes, are lower-boiling than either the 2-olefins or the corresponding paraffin hydrocarbons. This property of butene-1 renders difficult the fractional separation by distillation of $C_4$ components in processes producing or utilizing $C_4$ olefins, diolefins or iso-olefins since the boiling point of butene-1 is substantially the same as that of isobutylene and butadiene. Thus butene-1 may appear as a contaminant in isobutylene or butadiene fractions prepared by distillation. Processes involving the recovery of butenes from $C_4$ mixtures are subject to difficulties and losses since an appreciable portion of said butenes may be present as an isomer having a lower boiling point than the normal paraffin.

On the basis of these and other considerations it is often desirable that the normal olefins be as complete as possible, in either the alpha or the beta form, and for many processes the latter form is preferable. Inability to bring about this conversion or isomerization has led in some cases to the employment of complex chemical separation, solvent extraction methods, or a combination of the two for the segregation of a hydrocarbon mixture.

The reaction which converts alpha olefins to beta olefins is reversible and is of the time-equilibrium type. In other words butene-1 is converted gradually into butene-2 or vice versa until the equilibrium concentration is reached. Studies of this reaction show that at high temperatures maximum amounts of butene-1 are formed, while the maximum concentrations of butene-2 are obtained at low temperatures. Also, while only about 40 per cent conversion to butene-1 is possible at temperatures in the neighborhood of 1200° F., over 90 per cent conversion to butene-2 is possible at temperatures in the range of about 150 to about 250° F. if equilibrium can be reached at these temperatures. Since the extent of conversion of one isomer to the other depends on the isomerization reaction velocity and on the time allowed for the reaction, it is evident that in any commercial operation equilibrium concentrations are attainable only when suitable treating conditions can be met.

Isomerization of alpha olefins to beta olefins by thermal methods is unsatisfactory because of the slow rate of reaction at low temperature levels. Attempts have been made to promote the rate of isomerization reaction by means of catalysts and thus to obtain extensive conversion of alpha olefins to beta olefins at relatively low temperatures. The difficulty with previous catalytic processes is that the less active catalysts require high temperatures with the result that beta olefin concentrations are limited, while the more active catalysts concurrently promote polymerization reactions which result in excessive losses of olefins and other reactive components of hydrocarbon mixtures undergoing isomerization.

Accordingly, it is an object of this invention to provide an improved process for the conversion or isomerization of normal olefins. Another object of this invention is to provide a greatly improved isomerization catalyst whereby substantially equilibrium concentrations of the desired isomer may be obtained. A further object of the present invention is to provide such a process in which the isomerization of normal 1-olefins to 2-olefins may be carried out at low temperatures whereby maximum conversion to 2-olefins is obtained. Additional objects and advantages will be apparent to those skilled in the art.

I have discovered that the isomerization of olefins is very effectively catalyzed by adsorbent contact masses comprising magnesia. While the process of this invention is operative over a relatively wide range of conditions, it is of particular value when employed with substantially completely dehydrated catalyst masses and feed stocks. Under these conditions the isomerization reaction velocity is sufficiently high at relatively low temperatures so that substantially equilibrium concentrations of beta olefins are obtained. In one specific embodiment of the process of this invention, alpha olefins or hydrocarbon mixtures containing them are heated to reaction temperature and passed in substantially anhydrous condition in contact with a catalyst comprising magnesium oxide, said catalyst having been previously activated by treatment designed to substantially completely remove both adsorbed and chemically combined water and carbon dioxide. The reaction is conducted at atmospheric or at moderately elevated temperatures and pressures for a period of time sufficient to produce satisfactory isomerization and the beta olefin products may be segregated and utilized as desired.

In my copending application Serial No. 450,797, filed July 13, 1942, is described a process for isomerization of aliphatic olefins in the presence of a solid absorbent isomerization catalyst activated prior to use in the reaction by heating to a temperature above about 600° F. for a period of time sufficient to desorb and remove therefrom water and non-hydrocarbon gases. The present invention is directed to isomerization of aliphatic olefins by shifting the double bond thereof in the presence of specific catalysts, namely, those containing catalytic amounts of substantially anhydrous magnesium oxide, which I have found is particularly effective for catalyzing this reaction.

In accordance with the present invention the catalytic material, comprising magnesium oxide or a magnesium compound convertible to magnesium oxide when heated to an elevated temperature, is activated as described hereinafter before use as the conversion catalyst. The activation comprises converting magnesium compounds other than magnesium oxide to magnesium oxide, and substantially complete removal of water, carbon dioxide, and free oxygen from the catalyst. The anhydrous magnesium oxide resulting from the activation is an extremely active catalyst for promotion of the isomerization at low temperatures favorable to formation of beta olefins. At the relatively low temperatures, however, the catalyst activity is seriously reduced by contamination of the catalyst with carbon dioxide, water vapor, and in some cases by oxygen-containing gases. While the exact explanation of this poisoning action is not known it is believed to be related to the desorption rate of the gases mentioned or perhaps to a chemical reaction in the case of acidic gases. Thus, while the presence of these gases in the catalyst chamber may be tolerated when high temperatures are employed in the conversion, they should be excluded from the catalyst when it is employed for isomerization of the olefins at relatively low temperatures.

The activation of the catalytic material is preferably carried out in the catalyst chamber itself. The catalytic material, such as brucite, brucite-containing minerals, or other natural or synthetic materials containing magnesium hydroxide, magnesium carbonate, or magnesium oxide is placed in a suitable chamber and heated to an elevated temperature above 700° F. for a period of time sufficient to drive off substantially all of the water vapor. Air or other suitable gas may be passed through the catalyst chamber to aid in removal of the water vapor. When the catalyst is substantially free of water vapor, a stream of hot inert gas, nitrogen, for example, may be passed through the chamber while maintaining the catalyst at an elevated temperature until the catalyst is substantially free of oxygen, carbon dioxide, acidic gases and other contaminants. In the activation magnesium carbonate and magnesium hydroxide, if present in the catalytic material, are decomposed to magnesium oxide and the magnesium oxide is rendered substantially anhydrous. If magnesium carbonate or carbon dioxide is present in catalytic material, is is preferable to use steam or a gas containing relatively large percentages of water to aid in the activation. The water vapor accelerates decomposition of the carbonate and aids in removing the objectionable carbon dioxide. The catalyst mass may be rapidly freed of carbon dioxide by treatment at temperatures of about 700° F. or higher with steam or gases containing rather high proportions of water vapor. After substantially all of the carbon dioxide has been removed the catalyst mass may be purged with a relatively dry inert gas to remove substantially all water vapor, acidic gases, oxygen containing gases and other contaminants therefrom. The catalyst, after activation by either of the above described procedures is then ready for service.

The activation may be carried out at temperatures within the range of 700–1400° F. When steam or gas containing water vapor is employed in the activation, the temperature range of 700–1000° F. is preferred. If the activation is carried out by simply heating the catalyst to drive off water vapor or by use of a relatively dry gas passed over the catalyst, the temperature range of 1000–1400° F. is preferred for the activation. At lower temperatures than those indicated, the time required for activation is somewhat greater than that required for the activation at the preferred temperatures. While temperatures higher than 1400° F. may be employed in the activation, the activity of the catalyst is not appreciably improved thereby; actual damage to the catalyst may result from such high temperatures.

In the operation of this process, it is desirable in the interest of long catalyst life and high conversion to supply a properly conditioned feed stock to the activated catalyst. Accordingly, the charge is well dehydrated and freed from contaminants such as carbon dioxide, oxy derivatives of the hydrocarbons, heavy oil, etc. before being passed into the catalyst case. The catalyst may be reactivated by the same procedure as that employed for the original activation. Thus, a catalyst which has become deactivated in service may be purged of hydrocarbons and reheated to 700° to 1400° F. in a stream of air, steam, or inert gas to restore its isomerizing activity. After purging in an atmosphere of inert dry gas, for example, nitrogen, methane or the like, it may then be used for further isomerization treatment. In some cases a less drastic heat treatment, say at about 500 to about 800° F. with the hydrocarbon feed itself or with other refractory hydrocarbon gases, serves to restore the catalyst activity.

Isomerization by this process may be carried out equally well on olefin-containing feed stocks in either vapor or liquid phase. Liquid phase operation is conducted by operating at pressures in excess of the vapor pressure of the hydrocarbons undergoing treatment. Vapor phase isomerization may be carried out at atmospheric or relatively low superatmospheric pressures sufficient to insure the flow of vapors through the catalyst chambers and auxiliary equipment. In liquid phase operation, pressures up to about 500 to 1000 pounds per square inch or higher may be employed, depending upon the olefin being treated and the feed composition. In some cases, it may be convenient to govern the pressure by that maintained in associated operations, and the pressure flexibility of this process is adequate so that it may be fitted into any desired refining operation. Thus in a particular installation the pressure may be selected on the basis of previous operations which produce the olefin-containing feed stocks or of subsequent operations in which the olefins are utilized.

In accordance with the equilibrium relationships, the conversion of butene-1 to butene-2 is favored by relatively low operating temperatures while the conversion of butene-2 to butene-1 is favored by relatively high operating temperatures. In previous processes it is not ordinarily possible to attain commercially economical rates of conversion at temperatures below about 450° F. An important advantage of the present invention arises from the fact that conversion takes place at temperatures as low as about 50° F. and very rapid conversion is provided in the temperature range of about 200–400° F. This is particularly advantageous for conversion of butene-1 to butene-2. Isomerization may, of course, be obtained by the process of the present invention at temperatures as high as 1150° F. or up to the range of active hydrocarbon decomposition. The higher temperatures, for example, about 800–1000° F., are particularly favorable in conversion of butene-2 to butene-1. Rapid and efficient isomerization takes place at temperatures within the range of 50–1150° F. and equilibrium or near equilibrium conditions are rapidly reached. The concentration of each isomer may be controlled by control of the temperature of conversion, if desirable, and either isomer may be converted to the extent of the equilibrium conditions at any desired temperature within the operating range.

An outstanding advantage of this catalyst is the extraordinary selectivity which it displays for isomerization. Polymerization is substantially absent, and other side reactions are not ordinarily encountered. This may be largely due to the fact that many other reactions require higher temperatures than those best employed in this process, although some side reactions might be experienced at high temperatures above about 1000° F. A further great advantage of operation at the lower temperatures, is the unusual resistance of the catalyst to loss of activity under the influence of hydrocarbons. No carbon appears to collect on the catalyst at temperatures employed for beta olefin production, and therefore the activity continues indefinitely at the same high level as at the beginning. Thus on-stream times of unprecedented length are to be expected from the operation of this catalyst, and catalyst consumption is ordinarily limited only to mechanical losses.

Liquid flow rates ranging from about 0.5 to about 10 liquid volumes per volume of catalyst per hour are satisfactory in this reaction even at the lower temperature levels. Gas space velocities of from about 250 to about 5000 may be satisfactorily employed in carrying out this process in vapor phase operation. Lower feed rates than those specified ordinarily give no added conversion, since equilibrium is rapidly attained, and while more rapid charging may be employed, the resulting decrease in conversion is not satisfactory when the objective is a maximum yield of beta olefins. It usually is desirable in this process to obtain maximum isomerization, since lower conversion may increase the load upon the separation equipment, or where separation is not attempted, may give poorer operation of the subsequent processes which utilize the beta olefins.

The process of this invention may be utilized in connection with a variety of manufacturing processes for the production and segregation of normal olefins. It is of especial value in increasing the yield and efficiency of related processes for the production of beta olefins for use as raw materials in chemical syntheses of various types. If desired the hydrocarbon mixture following removal or utilization of beta olefins may be treated to produce additional amounts of alpha olefin prior to successive isomerization treatments.

The temperatures and flow rates used in isomerizing olefins according to the present invention vary somewhat with the olefin being treated and with the feed composition. Thus, assuming uniform catalyst activation, feed stocks containing major proportions of paraffin hydrocarbons may be treated at somewhat lower flow rates of about 0.5 to about 5 liquid volumes per hour per volume of catalyst, while feed stocks of higher olefin content may be treated at the same or at somewhat higher rates. Operating temperatures may be similarly adjusted to feed composition. Also, it may be desirable in some instances to treat the $C_5$ and higher olefins at relatively low flow rates and temperatures of from about 200 to about 600° F.

The materials which produce satisfactory catalysts for use in my process include those natural mineral ores which are predominantly magnesium hydroxide or magnesium oxide or which contain sufficient magnesium compounds convertible to the oxide under the above-described activating conditions to promote the isomerization reaction to the desired extent. These natural sources of magnesia include brucite and other materials which are predominantly magnesium oxide in varying states of hydration. The natural carbonate mineral magnesite may be converted to the oxide by heating preferably with steam to activation temperatures. Brucite, because of its high content of relatively pure magnesia, superior adsorbent qualities and exceedingly large area of active surface, is perhaps the most suitable mineral catalyst.

In addition to the natural mineral ores, synthetic magnesia preparations are entirely satisfactory although usually somewhat more expensive. Thus, magnesium hydroxide and the magnesium oxide prepared by conventional methods from magnesium salts and treated to substantially remove both chemically and mechanically combined water are excellent catalysts. Since the catalyst activity is usually considered as at least partially a function of the adsorptive characteristics and effective contact surface area, the catalysts are preferably employed in granular form with maximum porosity and hardness. The particle size is, of course, selected with regard to the desired hydrocarbon flow rate in either liquid or vapor phase.

The following examples will serve to explain further the operation of the present invention, without in any manner limiting the process thereto:

*Example I*

A batch of brucite mineral was placed in a catalyst case and heated to 1200° F. while passing air over the solid material. After eight hours no moisture was detectable in the exit gases and the air stream was discontinued. The catalyst chamber was swept out with a stream of dry methane for thirty minutes and then allowed to continue cooling to a temperature of 400° F. Upon reaching this temperature, the catalyst was contacted with a mixture of $C_4$ hydrocarbons containing 55 per cent normal butane, 35 per cent butene-1 and 10 per cent butene-2. This mixture was passed over the catalyst at atmospheric pressure, at a space velocity of 540, and at 400° F. The product contained 39 per cent butene-2 and only about 6 per cent butene-1, in addition to the unconverted normal butane. No polymer was obtained, and no carbon was deposited on the catalyst. There was no observable decrease in the activity of the catalyst throughout the 24-hour test.

Example II

Synthetic magnesia was charged into a catalyst case, heated for six hours at 1350° F., purged with nitrogen gas for half an hour and cooled to 260° F. The charge stock to this operation contained 23 per cent $C_3$ hydrocarbons, 12 per cent normal butane, 5 per cent isobutane, 55 per cent butene-1, and 5 per cent butene-2. Operating at a pressure of 50 pounds gage and 260° F., the charge was fed into the catalyst at a space velocity of 1000. No change was observed in the relative quantities of the components other than butene-1 and butene-2. The product contained 55 per cent butene-2 and 5 per cent butene-1. Again, no polymer losses were sustained, nor was any carbon deposited upon the catalyst.

Example III

A brucite catalyst was activated by heating at 1400° F. Upon completion of the activation, a feedstock containing 90 per cent butene-1 and 10 per cent butene-2 was passed over the catalyst at a temperature of 210° F. and under a pressure of 300 pounds per square inch. The feed was supplied at the rate of two liquid volumes per hour. The product of this operation contained 95 per cent butene-2 and 5 per cent butene-1. There were no losses by polymer formation, as before, and no decrease in activity was observed during the course of the operation.

Example IV

Using the catalyst of Example III, without intermediate treatment of any sort, the temperature was raised to 300° F. and the pressure increased to 500 pounds per square inch. Using the same stock and the same charging rate, a product was obtained containing 90 per cent butene-2 and 10 per cent butene-1. The catalyst had no carbon deposit, nor were any polymers formed.

Example V

A hydrocarbon liquid charge consisting of 60 per cent normal pentane and 40 per cent pentene-1 was passed over a magnesia catalyst prepared by calcining magnesite at 1400° F. The catalyst was maintained at 300° F. and 400 pounds gage pressure and the charge rate was 1 liquid volume per hour per volume of catalyst. The effluent liquid contained 27 per cent pentene-2, 13 per cent pentene-1 and the balance normal pentane.

Example VI

A liquid hydrocarbon mixture consisting of hexene-1 and $C_6$ paraffins was treated at 400° F. and 300 pounds gage pressure over a calcined mineral catalyst containing over 90 per cent magnesia. At a flow rate of 0.5 liquid volume per hour per volume of catalyst, 80 per cent of the hexene-1 was converted to hexene-2.

Example VII

Butene-2 was passed in vapor phase at a temperature of 980° F. over dehydrated brucite. The pressure was about 15 pounds gage and the space velocity was about 1100. Thirty percent of the butene-2 was converted to butene-1.

Example VIII

Magnesia catalyst containing some magnesium carbonate was activated by treatment with steam at 800° F. until $CO_2$ evolution ceased, then flushed with dry methane at the same temperature until no more water vapor was detectable in the effluent gas. This catalyst was then used to treat a dehydrated $C_4$ mixture containing 12 per cent butene-1, 25 per cent butene-2, 1 per cent isobutylene and the balance n-butane at atmospheric temperature, 50 pounds gage pressure and a flow rate of 0.5 liquid volumes of charge per hour per volume of catalyst. The treated mixture contained 1.8 per cent butene-1 and 36.2 per cent butene-2, with the other components unchanged. This conversion was maintained over a 24 hour period, after which the catalyst was reactivated by the same methods employed for the original activation. After repeated cycles of service and reactivation, the on-stream period was lengthened to about 60 hours.

It will be clear to those skilled in the art that numerous modifications may be made in the details of this invention as shown by the foregoing specific descriptions and illustrative examples. It is to be understood, therefore, that no limitations upon the invention are to be based upon any particular example or set of examples, but that the bounds of this invention are specifically defined in the appended claims.

I claim:

1. The process of effecting shifting of the double bond in a low-boiling aliphatic olefin which comprises intimately contacting said olefin at a temperature of from 50 to 450° F. with a catalyst consisting of anhydrous magnesium oxide activated by heating a magnesium compound which yields magnesium oxide to a temperature of from 700 to 1400° F. under conditions such as to substantially completely remove water, carbon dioxide and free oxygen therefrom and leave a residue of catalytically active magnesium oxide.

2. The process of effecting shifting of the double bond in a low-boiling aliphatic olefin which comprises intimately contacting said olefin under conditions such that shifting of the double bond in said olefin is substantially the sole reaction with a catalyst consisting of anhydrous magnesium oxide activated by heating brucite to a temperature of from 700 to 1400° F. under conditions such as to substantially completely remove water, carbon dioxide and free oxygen therefrom and leave a residue of catalytically active magnesium oxide.

3. The process of effecting shifting of the double bond in a low-boiling aliphatic olefin which comprises intimately contacting said olefin at a temperature of from 50 to 450° F. with a catalyst consisting of anhydrous magnesium oxide activated by heating magnesium carbonate to a temperature of from 700 to 1400° F. under conditions such as to substantially completely remove water, carbon dioxide and free oxygen therefrom and leave a residue of catalytically active magnesium oxide.

4. The process of effecting isomerization of butene-1 to butene-2 which comprises intimately contacting said butene-1 at a temperature of from 50 to 450° F. with a catalyst consisting of anhydrous magnesium oxide activated by heating brucite to a temperature of from 700 to 1400° F. under conditions such as to substantially completely remove water, carbon dioxide and free oxygen therefrom and leave a residue of catalytically active magnesium oxide.

HARRY E. DRENNAN.